United States Patent [19]

Chandler

[11] 4,357,242
[45] Nov. 2, 1982

[54] WATER PURIFICATION METHOD AND APPARATUS

[75] Inventor: Charles R. Chandler, Alexandria, Va.

[73] Assignee: Chandler Associates, Inc., Alexandria, Va.

[21] Appl. No.: 261,967

[22] Filed: May 8, 1981

Related U.S. Application Data

[63] Continuation of Ser. No. 117,512, Feb. 1, 1980, abandoned.

[51] Int. Cl.³ .............................................. C02F 1/52
[52] U.S. Cl. .................... 210/712; 210/738; 210/801; 210/195.1; 210/207; 210/512.1
[58] Field of Search ........ 210/702, 712, 714, 723–728, 210/738, 801, 195.1, 200, 205–207, 512.1, 256

[56] References Cited

U.S. PATENT DOCUMENTS

| | | | |
|---|---|---|---|
| 973,424 | 5/1908 | Greth | 210/207 |
| 2,528,094 | 10/1950 | Walker | 210/207 |
| 2,685,369 | 8/1954 | Crossley | 210/738 |
| 2,921,684 | 1/1960 | Baker | 210/262 |
| 3,006,474 | 10/1961 | Fitch | 210/512.1 |
| 3,377,271 | 4/1968 | Cann | 210/711 |
| 3,635,346 | 1/1972 | Zuckerman | 210/521 |
| 3,929,633 | 12/1975 | Visman et al. | 210/209 |
| 4,146,471 | 3/1979 | Wyness | 210/207 |

Primary Examiner—Peter A. Hruskoci
Attorney, Agent, or Firm—Eric P. Schellin

[57] ABSTRACT

A method for removing suspended solids and dissolved salts from water comprising setting up a whirlpool in the water, injecting a concentrated solution of flocculating agent into the whirlpool, withdrawing spent flocculating agent combined with contaminant from the bottom of the whirlpool, and withdrawing purified water flowing over the top of the whirlpool. Apparatus for water purification according to this method is also disclosed.

4 Claims, 3 Drawing Figures

WATER PURIFICATION METHOD AND APPARATUS

This is a continuation of application Ser. No. 117,512 filed Feb. 1, 1980, now abandoned.

BACKGROUND OF THE INVENTION

The present invention relates to a method and apparatus for purifying water.

The production of high quality water from wastewater or seawater requires a high degree of removal of soluble and/or suspended material.

According to present water treatment practices, conventional wastewater facilities remove suspended material continuously from wastewater by sedimentation, generally in tanks designed to provide sufficient time to permit suspended material to settle to the bottom of the tank. The settled solid material, commonly referred to as sludge, can be continuously or intermittently withdrawn. This basic settling procedure is relatively inefficient, requiring large quantities of both time and space.

Other current practices for the separation of salts from water require great quantities of energy to separate the water from the salts. Distillation, involving boiling the water, or membrane separation, involving forcing the water under pressure through a semipermeable membrane, consume large amounts of energy in return for purified water.

A variety of devices have been used in the past for obtaining pure water by a flocculation technique.

For example, Kalb, U.S. Pat. No. 1,777,849, discloses an apparatus for separating suspended particles of solid matter from water having a plurality of walls forming funnel-shaped baffle members. On the bottom of the apparatus is an outlet through which accumulated solid matter may be removed.

Zuckerman, in U.S. Pat. No. 3,635,346, discloses a solids removal device for treatment of water and wastewater. The device is provided with a vertical settling chamber having a final settling zone adjacent the upper end of the settling chamber including a plurality of inverted frustroconical settling plates of increasing diameter arranged one within another and defining annular conduits of upwardly increasing cross-sectional area therebetween.

Allen, U.S. Pat. No. 942,697, discloses an apparatus for separating solid matters from the liquid in which they are suspended. The apparatus comprises a liquid containing tank and an inverted separating cone suspended in the liquid in the tank. Means are provided to let relatively cleaner water cascade over the edge and into an adjacent tank.

However, none of the above-described patents discloses a method or apparatus for removing dissolved salts from seawater or wastewater by a flocculation technique.

SUMMARY OF THE INVENTION

A method and apparatus have now been developed that provides for removal of dissolved salts and colloids as well as suspended solids from seawater and wastewater using a flocculation technique.

The apparatus comprises a chamber, preferably cylindrical, divided into two main chambers approximately equal in height. Preferably, the diameter of the chamber is one half the height of the chamber. The bottoms of the two main chambers are in the shape of inverted cones. The inward surfaces of the inverted cones preferably slope approximately 30° downward from the horizontal. Each cone has a hole at the bottom surface. These holes are preferably 1/10 the diameter of the cylinder. A cylindrical sump with a bottom drain, controlled by a stop valve, extends from the bottom of the lower cone. A reinforcing means is provided to hold the cylinder in an upright position. Overflow ports are located near the top of the upper chamber for removal of the treated product.

In the upper main chamber, there is an inner cone on the same axis as the cylinder with a wall sloping downward and inward about 70° from the horizontal. The top of the cone is level with the top of the cylinder. The mean diameter of the cone is preferably ½ of the diameter of the cylinder. The height of the cone is preferably ⅔ the height of the first main chamber. The bottom diameter of this cone is approximately the same as the holes in the bottom of the cones in the chambers.

A plurality of flowback ports are located near the top of the lower main chamber and above the lowest part of the bottom of the upper chamber. The flowback ports are approximately equally spaced peripherally and are connected to an external tubular manifold which encircles the cylinder. A flow pipe connects this manifold to a pump. The pump is connected to a flat bottomed trough placed above the inner cone in the upper main chamber. The trough is aligned with one edge of the trough at the center of the inner cone and the other edge of the trough at the outer edge of the inner cone. The slope of the trough is slightly downward, preferably not more than 10° in a counterclockwise direction. Both input and flowback flows are introduced at the upper edge of the trough through a simple pipe manifold housing a line of small orifice outlets, with the input outlets toward the inner edge of the trough and the flowback outlets toward the outer edge of the cone. Flocculating agent is introduced into the center of the input flow from above the trough.

A plurality of the above devices can be connected in series to provide step by step water purification allowing for careful monitoring of each step until the desired degree of purification is reached.

DESCRIPTION OF THE DRAWINGS

Reference is now made to the accompanying drawings for a better understanding of the nature of the present invention. The drawings illustrate the best mode presently contemplated for carrying out the objects of the invention and are not to be construed as a restriction or limitation on its scope. Exact dimensions, proportions, etc., will be determined by the particular flocculating agent used and the salts and/or colloids to be removed.

Figure 1:
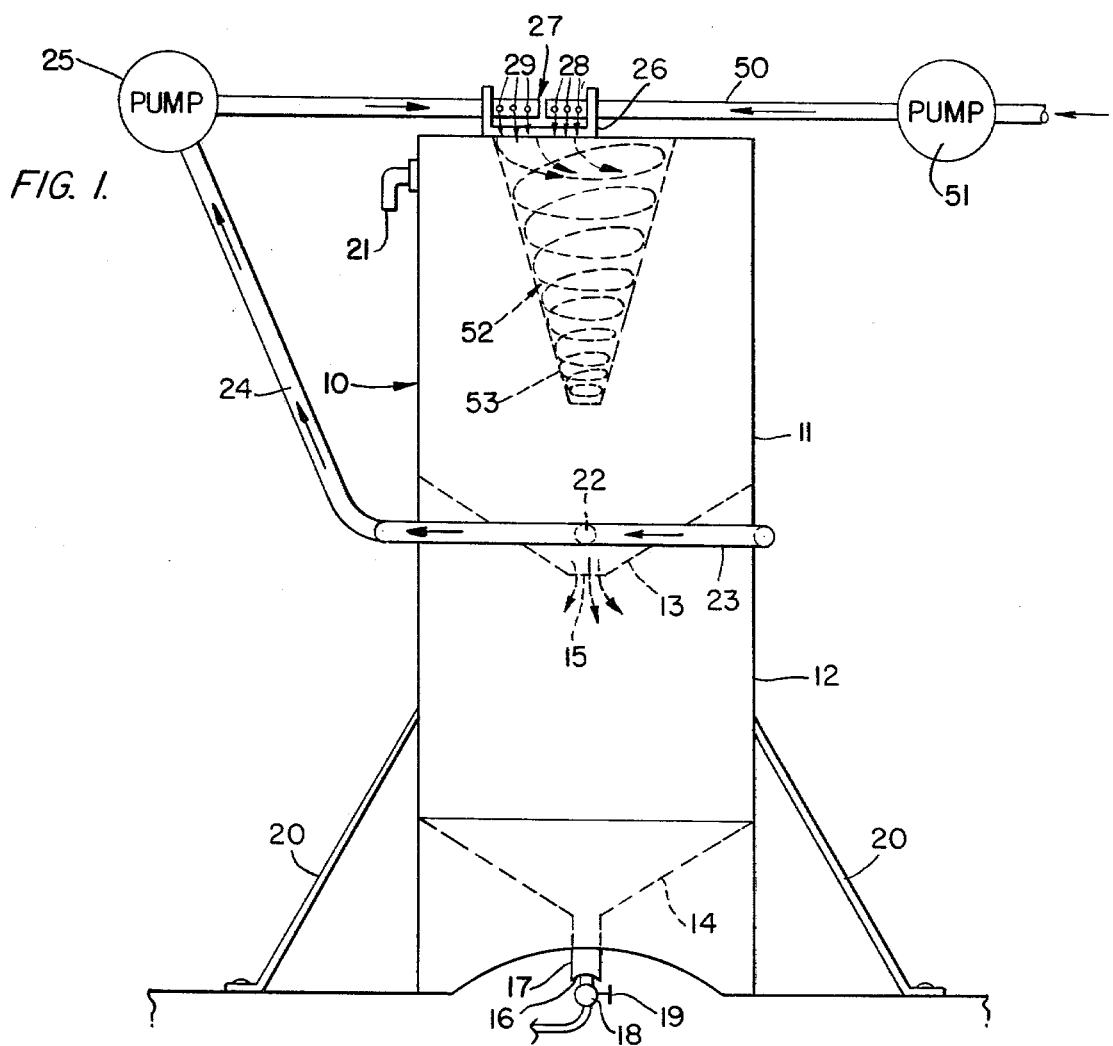
FIG. 1 is a side view of the water treatment device of the present invention.
Figure 2:
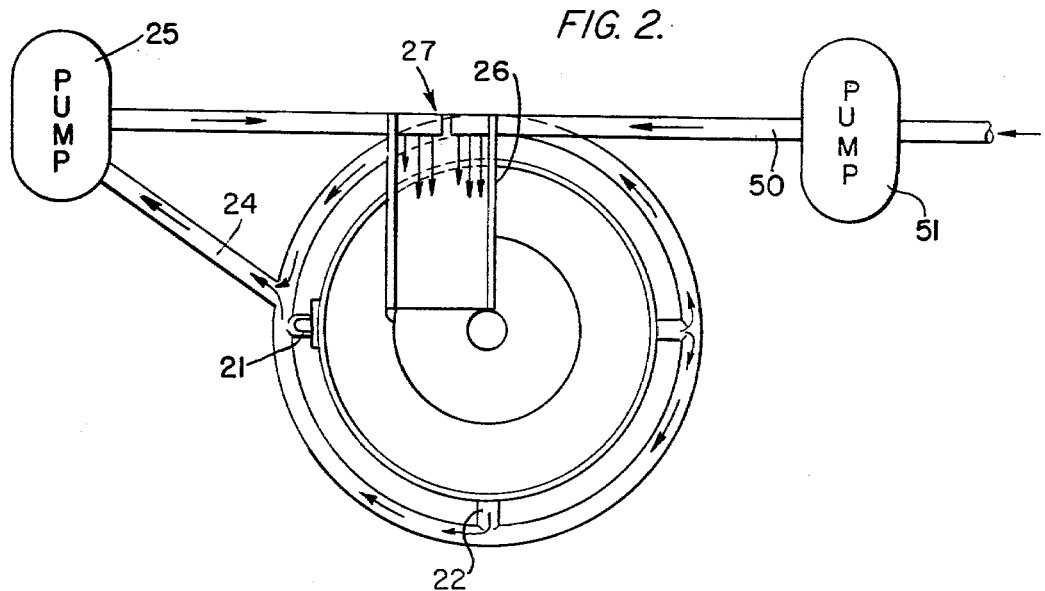
FIG. 2 is a top plan view of the device of FIG. 1.
Figure 3:
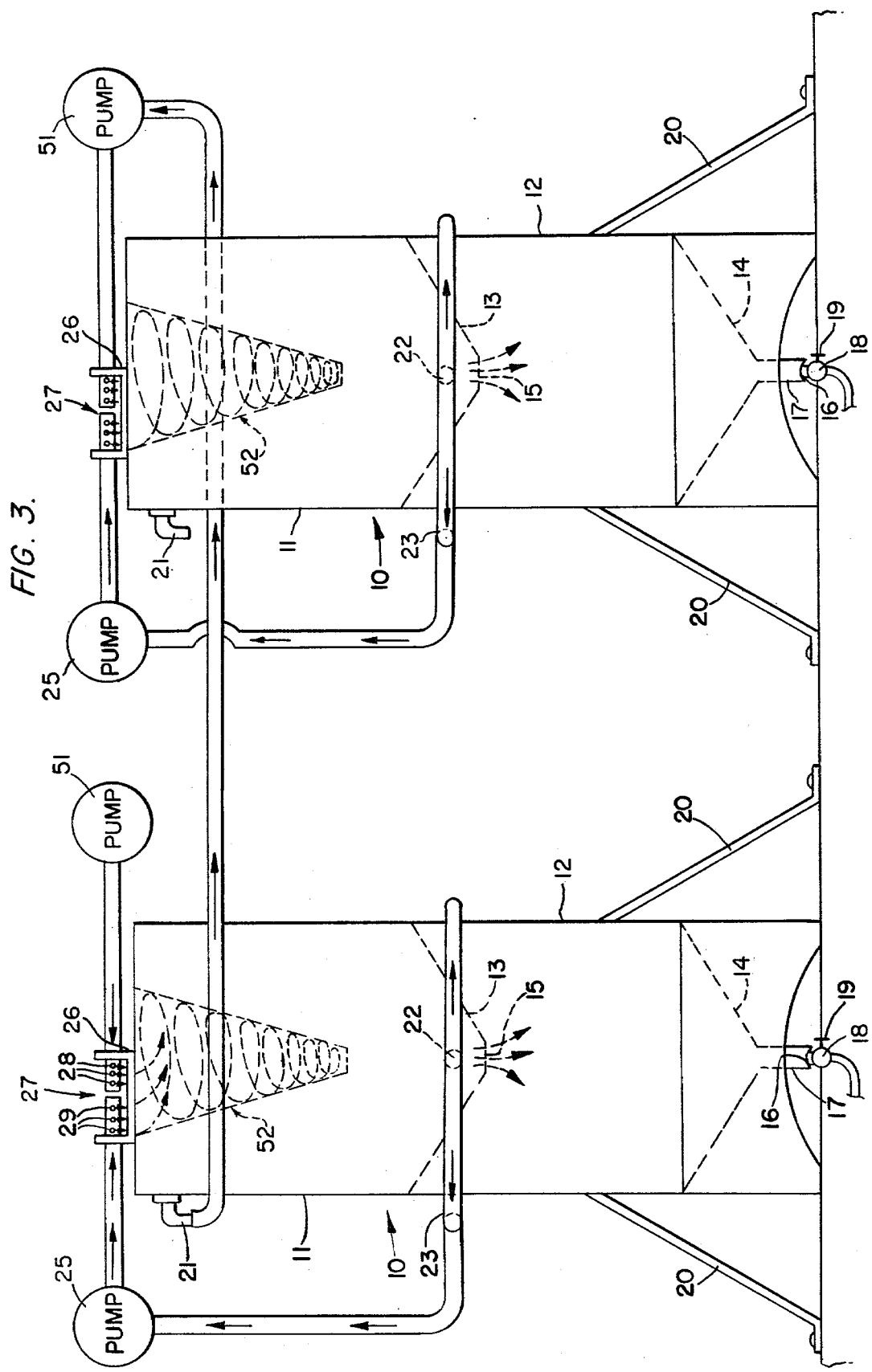
FIG. 3 is a side view of a plurality of the devices of FIG. 1 connected in a series.

Referring to the drawings, the water treatment device of the present invention is shown in FIG. 1, FIG. 2 and FIG. 3. The chamber of the device, 10, is divided into two main chambers, an upper main chamber 11 and a lower main chamber 12. The bottom 13 of the upper main chamber is in the shape of an inverted cone with a hole 15 at the bottom surface of the cone. The bottom 14 of the lower main chamber is in the shape of an inverted cone with a hole 16 at the bottom surface of the cone. An inner cone 53 is located in the upper main chamber. A cylindrical sump 17 with a bottom drain 18, controlled by a stop valve 19, extends from the bottom of the lower cone. Reinforcing means 20 are provided to hold the chamber 10 of the device in an upright position. Overflow ports 21 are located near the top of the first main chamber for removal of the treated water. Flowback ports 22 are located near the top of the second main chamber 12. The flowback ports 22 are approximately equally spaced peripherally and are connected to an external tubular manifold 23 which encircles the cylinder. A flow pipe 24 connects this manifold 23 to a pump 25. The pump 25 is connected to a flat bottomed trough 26 placed above the inner cone 55 within the upper main chamber 11. The trough 26 is aligned with one edge at the center of the upper main chamber 11 and the center of the inner cone 53 (which are the same) and the outer edge at the rim or upper edge of the surface of the inner cone 53.

Both input and flowback flows are introduced at the upper edge of the trough 26 through a simple pipe manifold 27 housing a line of small orifice outlets 28 and 29. The flowback outlets 28 are toward the outer edge of the trough and inner cone 53, and the input outlets 29 are toward the center inner cone and upper chamber 11.

Where further water purification is desired, a plurality of the devices 10 can be connected in series from the outflow 22 of one device 10 to the next device 10a by means of a pipe 29. Gravity can be used to effect the flow from one device to the next, or a pump 30 can be provided between devices 10 and 10a to ensure the proper flow of water from 10 to 10a.

In use, input water to be treated is introduced through pipe 50 with the assistance of pump 51. The input water flows through orifices 29 of trough 26, into the inner cone 55 in the upper main chamber 11. In the inner cone 53 a whirlpool action 52 is set up from the flow of water across the trough 26 and tangentially into the surface of the water already in the inner cone 53. Flocculating agent is introduced into the device into the center of the input flow in the trough 26 from above. The flocculating agent should be introduced not by itself but as a nearly saturated solution. If the flocculating agent is allowed to be quickly and prematurely dispersed throughout the water by rapid and thorough mixing as is the case in conventional flocculating systems, dissolved salts and colloids cannot be removed from the water, as the resulting particles of flocculant will be very minute and equally dispersed. The particles of flocculant will be balanced in ionic charge and will therefore tend to remain in suspension. The natural dispersion of flocculating agent throughout the input flow should be allowed to occur. The amount of solute will gradually equalize itself in concentration within an isolated volume of solvent. During this natural dispersion process the flocculating agent will withdraw the smallest particles of colloids in suspension, as well as the ions of any salts in true solution from suspension and solution respectively. The flocculating agent will gradually form an aggregate large enough to be seen by the human eye and heavy enough for gravity to remove it from suspension.

Flowback water from the second main chamber 12 is pumped via pump 25 back to the trough through pipe 27 and orifices 28.

The whirlpool action 52 set up in the inner cone 11 causes the floc to tend toward the center of the flow emitting from the bottom of cone 15 and down into the lower chamber 12. The part of the flow from the bottom of cone 15, which was equal to the input flow and closest to the cone side surface, then flows outward and very slowly upward to the overflow level where it exits through the overflow ports 22. Gravity and inertia cause the floc entering the lower second main chamber 12 to continue downward through the center of the lower main chamber 12 and into the sump 17 from which it can be withdrawn periodically. The resulting floc as a byproduct may be valuable in itself. Depending upon the nature of the salt in original solution present in the floc, the floc may prove to be more valuable than the purified water.

A variety of well-known flocculating agents can be used in the practice of the present invention. Examples of such flocculating agents readily available include alum and magnesium sulfate, as well as many common polymeric flocculating agents. The polymerics are more efficient apparently because of their greater molecular weight. The flocculating agents are preferably introduced as concentrated aqueous solutions.

It has been found that ionized salts can only be removed from the water being treated if the flocculating agent is introduced as a concentrated solution into the water to be treated at a centralized locus and then allowed to disperse. According to conventional wisdom, this is totally unexpected, as ionized salts in water are not supposed to be subject to flocculation.

DETAILED DESCRIPTION OF THE INVENTION

A test apparatus, as described above, was constructed to hold seven liters of water. The apparatus was completely filled with water containing 30 parts per thousand (ppt) sodium chloride. With the apparatus completely filled with salt water to be treated, a flow of input salt water from the line input across the trough gave the water a circular motion and raised the level of water inside the inner cone. Since the upper main chamber allows a free flow of water, the level of the water outside the cone equalized with that inside the cone, and caused an overflow out the overflow ports. The first seven liters of this overflow product was discarded arbitrarily as "start-up". The flowback pump was started to draw water from the lower main chamber via the flowback ports and manifold to return the water to the inner cone of the upper main chamber, to be added in the trough alongside the input flow. This flowback system provided for a flow of water from the upper main chamber down into the lower main chamber and increased the circular and downward motion in the upper cone.

The flocculation agent was injected as a concentrated aqueous solution. In this case the flocculating agent was a polymeric flocculating agent marketed by Premier Chemicals, Inc., as a detergent under the trade name STRIPPETTE. The solution of flocculating agent was injected in small individual quantities (totaling up to 200 ml. per step or stage), through a small orifice, into the middle of the input flow across the trough. The whirlpool flow resulting in the cone caused the resulting floc to tend, because of centripetal force, toward the center of the flow emitting from the bottom of the cone and down into the lower chamber. The part of the flow from the bottom of the cone which was equal to the input flow and closest to the side surface of the cone then flowed outwardly and slowly upward to the overflow level where it exited through the overflow ports.

Gravity and inertia caused the flocculant entering the lower chamber to continue downward through the center of the lower chamber down into the sump to be drawn off periodically as byproduct.

It has been postulated that the polymeric flocculants may be more effective than alum or epsom salts when used according to the present invention because these polymeric flocculants have a greater molecular weight than the alum or epsom salts.

To test the effectiveness of the process and apparatus of the present invention, water containing up to 30 parts per thousand (ppt) salt was run through a flocculation device as described above using 200 ml. of a saturated aqueous solution of STRIPPETTE as flocculating agent per liter of product per step/stage. All tests were made at room temperature (20° C.). These tests collectively showed that a reduction of salt content of three ppt. can routinely be obtained in one stage, with slight variations in the variables of input, flowback, and flocculating agent. Seven runs of water containing from 30 ppt. to 24 ppt. sodium chloride gave the following reductions in the salinity of the overflow product:

| Run # | Input Salinity, ppt. | Product Salinity, ppt. | Reduction in Salinity, ppt. |
|---|---|---|---|
| 1 | 30 | 26.4 | 3.6 |
| 2 | 30 | 27.0 | 3.0 |
| 3 | 29 | 26.0 | 3.0 |
| 4 | 27.4 | 25.1 | 2.3 |
| 5 | 27.0 | 23.5 | 3.5 |
| 6 | 25.5 | 22.5 | 3.0 |
| 7 | 24.0 | 22.5 | 2.5 |
| | | Average reduction | 2.986 |

The reduction of concentration of salt in the solution, expressed in ppt., was in direct proportion to the ratio of output (overflow) volume to flocculating agent input volume. The maximum efficient level of operation of the test apparatus appears to be a 3 ppt. reduction per stage.

A careful control of flow of water within the apparatus is imperative. The flow should be slow and steady, with minimal turbulence which can cause premature mixing. Flocculation should ideally occur in the upper cone. The water being drawn down into the lower chamber should contain a maximum of resulting floc and a minimum of flocculating agent still in solution. The blue dye contained in STRIPPETTE, is useful in showing location and concentration levels of still dissolved flocculating agent within the apparatus. Excessive drawing of still dissolved flocculating agent into the lower chamber was indicated in the test runs by the bluing of the water in that chamber.

It is conceivable that the process and apparatus of the present invention can be utilized for extracting the mineral components of salts from solution.

The direction of floc flow should be straight down through the lower chamber. It was found that if the flow in the lower chamber to the flowback ports overcomes the forces of gravity and inertia so as to pull any discernible amount of floc upwards towards the ports, the flow should be temporarily stopped until the flocculant settled downward.

Ideally both of these flows could be adjusted over long runs with properly adjusted monitoring instruments so that the two above-described conditions would not occur.

What is claimed is:

1. A method for purifying water containing dissolved salts and colloids as the contaminants in a device which is subdivided into three treatment zones in vertical alignment comprising:
   (a) introducing the water to be purified into the top portion of a first zone including a downwardly depending cone configuration effective for setting up a whirlpool of said water in said first zone;
   (b) injecting a concentrated solution of flocculating agent into the top of the whirlpool to form a floc consisting of said flocculating agent and dissolved salts and colloids adhering to the flocculating agent;
   (c) drawing down the water and concentrated solution of the flocculating agent and formed floc from the bottom of the cone shaped first zone into a second zone which surrounds said first zone and has a downwardly depending cone portion configuration; the top of said first zone being on the same level as the top of said second zone;
   (d) withdrawing a portion of the treated water from the top of the second zone;
   (e) drawing the remainder of the water and concentrated solution of flocculating agent and formed floc from the bottom of the cone shaped portion of the second zone into a third zone which is confined by means below said second zone terminating in a bottom having a downwardly depending cone portion configuration;
   (f) withdrawing radially a portion of the treated water from near the top portion of the third zone and introducing this water tangentially into the whirlpool of the first zone for further treatment;
   (g) withdrawing floc and a quantity of water from the bottom of the third zone;
   (h) controlling the rate of introduction of to-be-treated water and concentrated solution of flocculating agent and the withdrawal of treated water and floc to direct said floc downwardly from said first zone to the bottom of said third zone.

2. The method of claim 1 wherein the flocculating agent is alum.

3. The method of claim 1 wherein the flocculating agent is magnesium sulfate.

4. An apparatus for purifying water containing dissolved salts and colloids as the contaminants comprising:
   (a) a vertically disposed cylindrical vessel having a top portion and a bottom portion;
   (b) said vessel being subdivided by a downwardly depending cone shaped wall to define an upper chamber and a lower chamber;
   (c) the said cone shaped wall having an opening centrally therethrough to provide communication between said upper chamber and said lower chamber;
   (d) said upper chamber having positioned therein concentrically and vertically displaced from the said cone shaped wall a downwardly dependent cone shaped vessel;
   (e) said cone shaped vessel having an opening centrally at the bottom of the cone shaped vessel for communication between said upper chamber and internally of said cone shaped vessel and said cone shaped vessel being dimensioned to terminate substantially on the same horizontal plane as the top portion of the cylindrical vessel;

(f) a first means to introduce said water tangentially to the top portion of said cone shaped vessel and for injecting a flocculating agent into said water;

(g) a second means to remove radially water from the top portion of said lower chamber and to introduce such water tangentially of the top portion of said cone shaped vessel;

(h) said cylindrical vessel and said lower chamber terminating in a downwardly depending cone shaped wall having centrally disposed a port means for removing floc including dissolved salts and colloids communicating internally with said lower chamber;

(i) said upper portion of said cylindrical vessel and upper portion of said upper chamber having overflow port means adapted and constructed to remove purified water from said upper chamber.

* * * * *